United States Patent [19]
Asaba et al.

[11] Patent Number: 5,226,852
[45] Date of Patent: Jul. 13, 1993

[54] OLDHAM COUPLING HAVING GROOVES WITH ELASTIC WALL PORTIONS

[75] Inventors: Eiki Asaba; Isao Kariya, both of Yamanashi, Japan

[73] Assignee: Fanuc Ltd., Yamanashi, Japan

[21] Appl. No.: 674,325

[22] PCT Filed: Aug. 21, 1990

[86] PCT No.: PCT/JP90/01063
§ 371 Date: Apr. 15, 1991
§ 102(e) Date: Apr. 15, 1991

[87] PCT Pub. No.: WO91/02907
PCT Pub. Date: Mar. 7, 1991

[30] Foreign Application Priority Data
Aug. 22, 1989 [JP] Japan .................. 1-214098

[51] Int. Cl.$^5$ ............................. F16D 3/04
[52] U.S. Cl. ................................. 464/104
[58] Field of Search ............ 464/102, 104, 113, 137

[56] References Cited

U.S. PATENT DOCUMENTS

| | | | |
|---|---|---|---|
| 2,892,328 | 6/1959 | Templeton | 464/104 |
| 3,438,221 | 5/1989 | Paulsen | 464/76 |

FOREIGN PATENT DOCUMENTS

44-26336 11/1969 Japan .
51-123451 10/1976 Japan .
59-19719 2/1984 Japan .
62-113917 5/1987 Japan .
1-25924 5/1989 Japan .

Primary Examiner—Daniel P. Stodola
Attorney, Agent, or Firm—Nikaido, Marmelstein, Murray & Oram

[57] ABSTRACT

Projections (16, 18) formed on shafts (10, 12) and received in grooves (20a, 20b) of an intermediate disk (14) to form an Oldham coupling, in general, perform a small sliding movement relative to the intermediate disk (14), and thus the projections (16, 18) and the side surfaces of the grooves (20a, 20b) are abraded to cause backlash to appear between the corresponding surfaces. This backlash makes an accurate transmission of the rotation of one shaft to the other impossible. According to the present invention, at least the bottom walls (22a, 22b) of the grooves (20a, 20b) of the intermediate disk (14) are formed of an elastic material, and each of the grooves (20a, 20b) is formed in a width smaller than that of the corresponding projection (16, 18) so that the projections (16, 18) are held elastically between the side surfaces (24a, 24b) of the corresponding grooves (20a, 20b), and thus no backlash occurs between the corresponding surfaces of the projections (16, 18) and the grooves (20a, 20b), even if those surfaces are abraded to some extent.

5 Claims, 1 Drawing Sheet

OLDHAM COUPLING HAVING GROOVES WITH ELASTIC WALL PORTIONS

TECHNICAL FIELD

The present invention relates to an Oldham coupling for connecting two parallel shafts. The Oldham coupling can be used, for example, for connecting an output shaft of a motor and a shaft of a detector.

BACKGROUND ART

In the conventional Oldham coupling, projections formed in the end surfaces of shafts, and grooves formed in the intermediate disk are machined to a high accuracy, and the grooves of the intermediate disk are formed so that the bottom walls of the grooves are extremely rigid, to ensure an accurate transmission of a rotation of one shaft to the other.

However, the projections of the shafts and the side surfaces of the grooves of the intermediate disk are abraded in an extended period of operation due to the sliding movement of the projections and the intermediate disk relative to each other, and consequently, the clearances between the projections and the grooves increase to cause a loss of motion, which deteriorates the accuracy of the rotation.

DISCLOSURE OF THE INVENTION

Accordingly, an object of the present invention is to provide an Oldham coupling in which a clearance is not formed between the adjacent parts for an extended period of operation, so that an accurate transmission of a rotation can be achieved.

In view of the foregoing object, the present invention provides an Oldham coupling for connecting two shafts, comprising projections formed respectively in one end surface of each shaft and an intermediate disk provided with mutually perpendicular grooves respectively in the opposite side surfaces thereof, the width of the groove formed in one of the side surfaces adjacent to the end surface of one of the two shafts being slightly smaller than that of the projection of the corresponding shaft, and the width of the groove formed in the other side surface being slightly smaller than that of the projection of the other shaft, and the bottom walls of the grooves being made from an elastic material.

The elastic bottom walls of the grooves of the intermediate disk enable each of the projections of the shafts having a width slightly greater than that of the corresponding groove to be pressed in the corresponding groove. The projection thus pressed in the groove, and slightly expanding same, is kept in close contact with the side surfaces of the groove due to the resilience of the elastic bottom wall of the groove, namely, no clearance will be formed between the side surfaces of the groove and the projection even if the projection and the surfaces of the groove are abraded over an extended period of operation.

BEST MODE OF CARRYING OUT THE INVENTION

Figure 1:
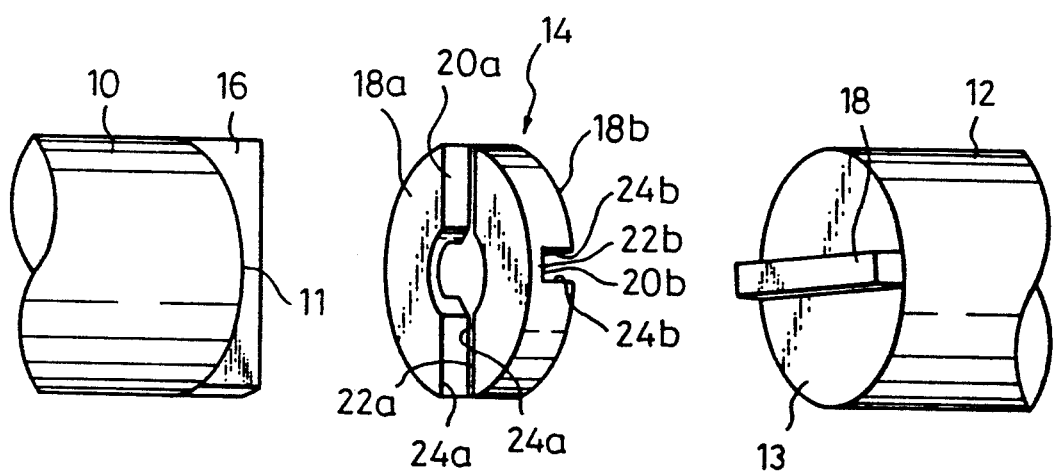
FIG. 1 is a perspective view of an Oldham coupling in a preferred embodiment according to the present invention.

The present invention will be described in detail with reference to a preferred embodiment thereof illustrated in the accompanying drawing. Projections 16 and 18 having the shape of a rectangular prism are formed respectively in the respective end surfaces 11 and 13 of two shafts 10 and 12 extending axially in parallel to each other. An Oldham coupling for connecting the shafts 10 and 12 has an intermediate disk 14 provided with mutually perpendicular grooves 20a and 20b, respectively, in opposite side surfaces 18a and 18b thereof. The respective bottom walls 22a and 22b of the grooves 20a and 20b are relatively thin. The intermediate disk 14 is an elastic member formed of a plastic, such as ULTEM (Trade Name), by injection molding. Therefore, the interval between the side surfaces 24a of the groove 20a, and the interval between the side surfaces 24b of the groove 20b, can be elastically expanded. When forming the intermediate disk 14, the grooves 20a and 20b are formed in widths slightly smaller than those of the projections 16 and 18 of the shafts 10 and 12, respectively. The elasticity of the bottom walls 22a and 22b enables the projections 16 and 18 to be pressed into the corresponding grooves 20a and 20b, and thus the projection 16 is kept in close contact with the side surfaces 24a of the groove 20a, and the projection 18 is kept in close contact with the side surfaces 24b of the groove 20b, so that no backlash will occur between the projections 16 and 18 and the side surfaces of the corresponding grooves 20a and 20b even if the feathers 16 and 18 and the side surfaces 24a and 24b of the grooves 20a and 20b are abraded to some extent due to a sliding movement relative to each other during an extended period of operation. Accordingly, the rotation of one of the shafts 10 and 12 can be transmitted to the other at a high accuracy. It is also possible to form the intermediate disk 14 of a metal, such as a phosphor bronze.

As apparent from the foregoing description, an Oldham coupling in accordance with the present invention employs an intermediate disk formed of a material and in a shape such that projections formed in the end surfaces of shafts are held elastically between the side surfaces of the corresponding grooves of the intermediate disk, and accordingly, no backlash occurs between the projections and the side surfaces of the corresponding grooves even if the projections and the side surfaces of the grooves are abraded to some extent. Thus, the Oldham coupling is capable of accurately transmitting the rotation of one shaft to the other for an extended period of operation.

We claim:

1. An Oldham coupling for connecting two shafts, comprising:
    projections formed respectively in one end surface of each shaft; and
    an intermediate disk provided with substantially mutually perpendicular grooves respectively in opposite side surfaces thereof, said grooves each having a bottom wall and side surfaces, the distance between said side surfaces of each groove being slightly smaller than that of the corresponding projection, and said bottom wall of each groove being formed of an elastic material for elasticly expanding and increasing the distance between said side surfaces to accommodate and secure said projections within said grooves.

2. An Oldham coupling according to claim 1, wherein said intermediate disk is formed of a plastic by injection molding, and the respective bottom walls of the grooves have a sufficiently small thickness to allow the bottom walls to elastically expand and increase the distance between said side surfaces of each groove.

3. An Oldham coupling according to claim 1, wherein said projections of the shafts are in the form of rectangular prisms.

4. An Oldham coupling according to claim 1, wherein said intermediate disk comprises metal and the respective bottom walls of the grooves have a sufficiently small thickness to elastically expand and increase the distance between said side surfaces of each groove.

5. An Oldham coupling according to claim 4, wherein said metal comprises phosphor bronze.

* * * * *